United States Patent [19]

Whitlock

[11] 4,142,306
[45] Mar. 6, 1979

[54] TIME-SPACE CLOCK

[76] Inventor: Ben H. Whitlock, 137 Cedarhurst St., Islip Terrace, N.Y. 11752

[21] Appl. No.: 861,969

[22] Filed: Dec. 19, 1977

[51] Int. Cl.² ............................................. G09B 27/00
[52] U.S. Cl. ............................................. 35/43; 58/3
[58] Field of Search ............................ 35/43, 44; 58/3

[56] References Cited

U.S. PATENT DOCUMENTS

| 371,306 | 10/1887 | Conant | 58/3 |
| 556,486 | 3/1896 | Yaggy | 35/44 |
| 573,091 | 12/1896 | Lindahl | 35/44 |
| 1,153,492 | 9/1915 | Hoitinga | 58/3 |

Primary Examiner—William H. Grieb

[57] ABSTRACT

An educational time-space clock having an oval dial provided with astronomical information; and indicating hands which rotate counterclockwise in proper sequence; as well as the current hour and minute or second indicating hands which also rotate counterclockwise with respect to calibrations of minutes, and hours in Roman numerals, arranged on the dial for counterclockwise reading. An earth hand carries a representation of the earth having an orbiting small ball corresponding to the moon. The second earth hand bears a legend of the speed of light. The hour hand simulates a rocket in flight, and an alarm-timesetting hand is in the form of a lightning bolt. A calendar display and a historical data display are also provided on the front of the clock.

4 Claims, 5 Drawing Figures

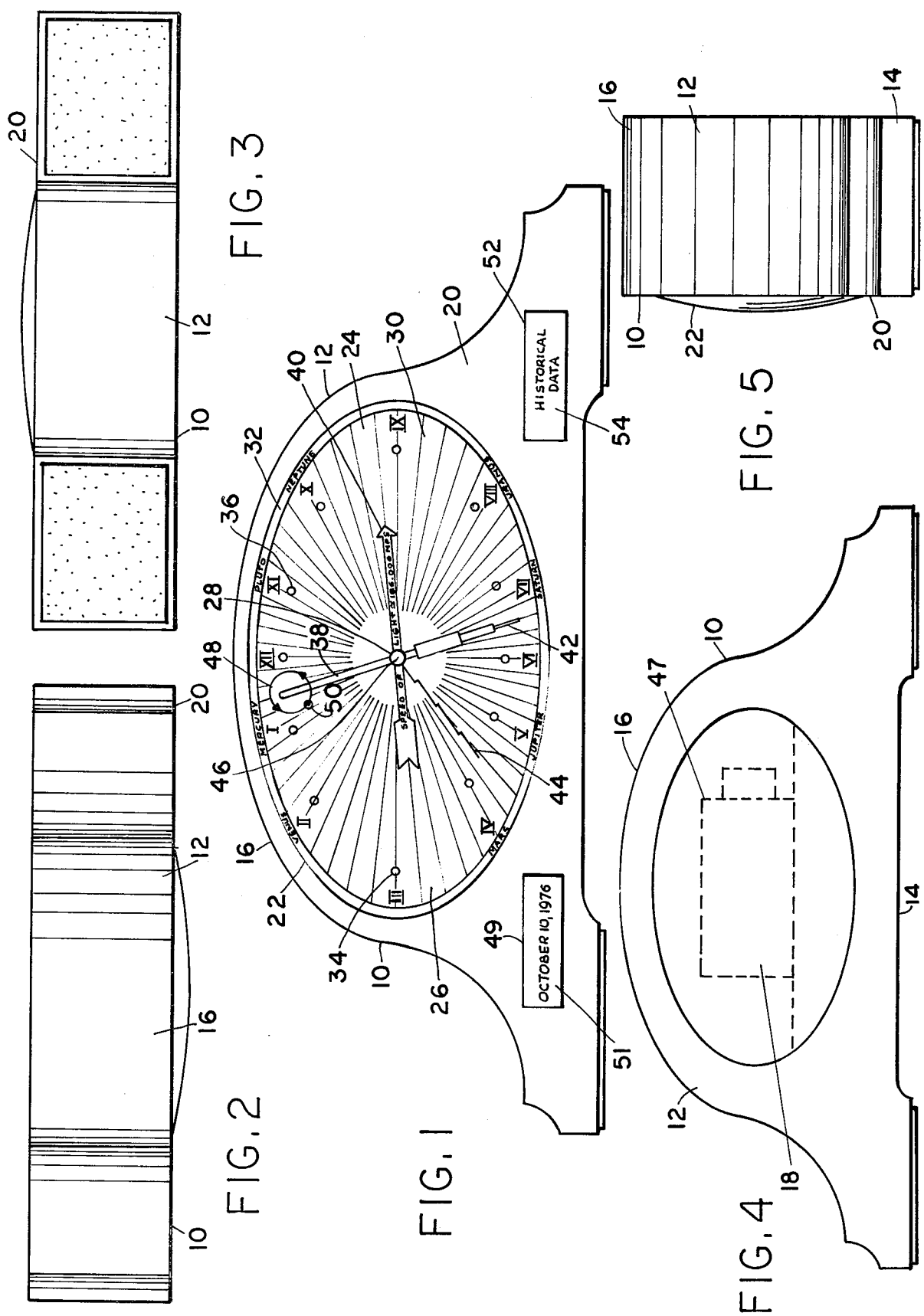

TIME-SPACE CLOCK

This invention relates to space-time clocks, and more particularly to educational space-time display devices.

BACKGROUND OF THE INVENTION

Space-time clocks have been proposed in the past, but their educational value is limited.

The main object of this invention is to increase the educational value of space-time clocks, especially for young people, and students.

SUMMARY OF THE INVENTION

A space-time clock having an oval face is provided having an oval dial with a vivid display of the sun at the center. Radial lines representing the sun's rays radiate from such sun toward an oval area calibrated to indicate hours of the day, counterclockwise. An hour hand in the form of a rocket in flight is operated counterclockwise by a suitable clock mechanism in the clock cabinet moving around the front of the dial to indicate hourly time. A second, or minute hand, is also operated counterclockwise by such mechanism, which also turns an "earth" hand counterclockwise around the dial. The earth hand carries a disk, representing the earth; and a small ball, representing the moon, orbiting around the earth as the latter progresses in orbit around the sun.

Outside of the main area of the dial, is an oval rim carrying the names of the other planets which orbit the sun, suitably spaced, adjacent the Roman numerals indicating the hours of the day counterclockwise. A fourth hand, representing a bolt of lightning, is provided to preset the time for an alarm to be sounded by the clock mechanism.

The clock cabinet is also provided with two relatively small rectangular display windows located on either side, near the lower part of the oval display. A calendar showing the current month, day and year, driven by the clock mechanism, or hand set, is located back of the left window. The other rectangular display is provided with a tape showing historical data, preferably of an astronomical nature. The tape is operated by the clock mechanism, or by hand if desired.

The face of the space-time clock also is provided with representations of the satellites adjacent the hour numerals on the dial, and light/dark illumination in color, representing day/night effect is coordinated with the time-space indications. Vivid colors of varying hues are used to identify the several functions, and the second, or minute hand bears the legend: "Speed of Light = about $1.86 \times 10^5$ miles per second, or about $3.00 \times 10^5$ K.P.S."

BRIEF DESCRIPTION OF THE DRAWINGS

FIG. 1 is a view in front elevation of a space-time clock illustrative of the invention;

FIG. 2 is a top plan view thereof;

FIG. 3 is a bottom plan view;

FIG. 4 is a view in rear elevation of the clock; and

FIG. 5 is a view in side elevation thereof.

DETAILED DESCRIPTION OF THE INVENTION

As shown in FIGS. 1–5, space-time clock 10 comprises a cabinet 12 having a relatively wide base 14 and an arched upper part 16, housing an alarm clock mechanism 18 which may be electrically powered in the conventional way, or spring wound. The clock cabinet 12 comprises a front panel 20 containing an oval window 22 of transparent material, such as glass or plastic. Behind the window 22 is an oval face 24 provided with an oval dial 26 having a round central area 28 representing the sun, from which radiate minute or second lines 30 representing sun rays. The (12) hours of the day are printed on the dial 26 in Roman numerals I-XII, counterclockwise, adjacent rim 32. On such rim 32 is printed the names of the planets: Mercury, Venus, Mars, Jupiter, Saturn, Uranus, Neptune and Pluto. The rin 32 is also illuminated to show a different day/night color effect, which varies with seasons. The dial 26 also contains visual representations 34 of various space satellites and/or stars adjacent the Roman numerals: III, VI, IX and XII. Adjacent the other Roman numerals are representations 36 of the corresponding planets, other than earth, orbiting the sun.

The clock mechanism 18 in the cabinet 12 operates four hands 38, 40, 42 and 44 in proper relationship to one another over the oval dial 26, about a common center 46. The hand 38 carries a disk 48 representing the earth about which a small ball 50, representing the moon orbits as the earth hand 38 progresses counterclockwise over dial 26. The hand 40 is a second, or minute hand which bears the legend "Speed of Light = about $3.00 \times 10^5$ K.P.S.," or "about $1.86 \times 10^5$ M.P.S.".

Hand 42 is operated by the clock mechanism 18 counterclockwise around the dial 26 to indicate the nearest hour of Roman numerals I-XII. Such hour hand 42 in the form of a rocket shooting outwardly from the center 46. The hand 44 is shaped to represent a bolt of lightning, for setting the time for the alarm 47 of clock mechanism 18 to operate. The four hands 38, 40, 42 and 44 are advanced counterclockwise in astronomical time sync., for showing their various functions, as will be understood by those skilled in the art.

In the lower left area adjacent the base 14 of the front panel 20, is a rectangular window 49 for a calendar display 51 of the current month, day and year. The calendar 51 is operated either by the clock mechanism, or manually. In the lower right side adjacent the base 14 of the front panel 20, is a similar rectangular window 52 for the display of tape 54 of historical data of interest and educational value to amateur astronomers as well as to children in general.

The time-space clock of the invention is not only highly attractive, but is truly instructive of astronomical information in an easy to see way.

I claim:

1. A space-time clock comprising
   a cabinet having an oval opening,
   a space-clock mechanism housed within said cabinet having an oval face fitting said opening,
   an oval transparent window mounted in said opening in front of said face,
   an oval dial on said face representing the hours of a day,
   a round area in the center of said dial representing the sun, having ray lines radiating therefrom,
   a rim area of said dial having names of the several planets thereon,
   said dial also containing representation of satellites thereon,
   an hour hand operated by said mechanism for counterclockwise movement around the center of the dial, having the appearance of a rocket, a minute earth hand, similarly operated, bearing the legeng: "Speed of Light = about $1.86 \times 10^5$ M.P.S."

an earth hand operated counterclockwise by said mechanism around said dial, said cabinet also having rectangular windows in the front panel thereof located near the base on opposite sides of said oval window, for showing the current month, day and year in one rectangular window, a calendar operated by said mechanism for such showing, and a tape for showing through said other rectangular window, astronomical events that are fore-recorded thereon.

2. A space-time clock as defined by claim 1, in which said earth hand is provided with a small orbiting ball representing the moon, near the free end of said hand.

3. A space-time clock as defined by claim 1, in which said mechanism comprises an alarm having a pre-setting hand in the shape of a bolt of lightning, manually adjustable with respect to said dial.

4. A space-time clock as defined by claim 1, in which different night/day color effects are provided for said dial rim area.

* * * * *